Aug. 12, 1941.  W. J. BRETH ET AL  2,251,904
TIRE BUILDING MACHINE
Filed Oct. 14, 1938  9 Sheets-Sheet 1

INVENTORS
WALTER J. BRETH
MAX ENGLER
BY HERMAN T. KRAFT
Evans & McCoy
ATTORNEYS

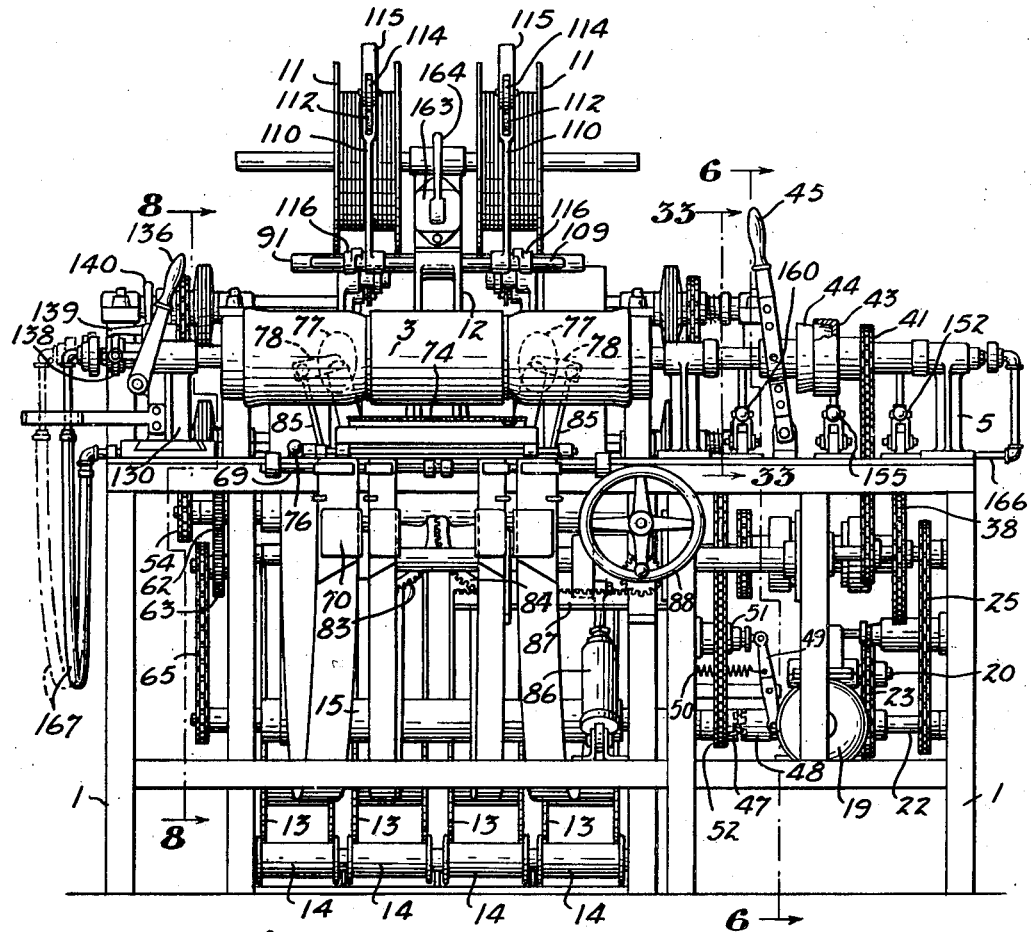
Fig. 3
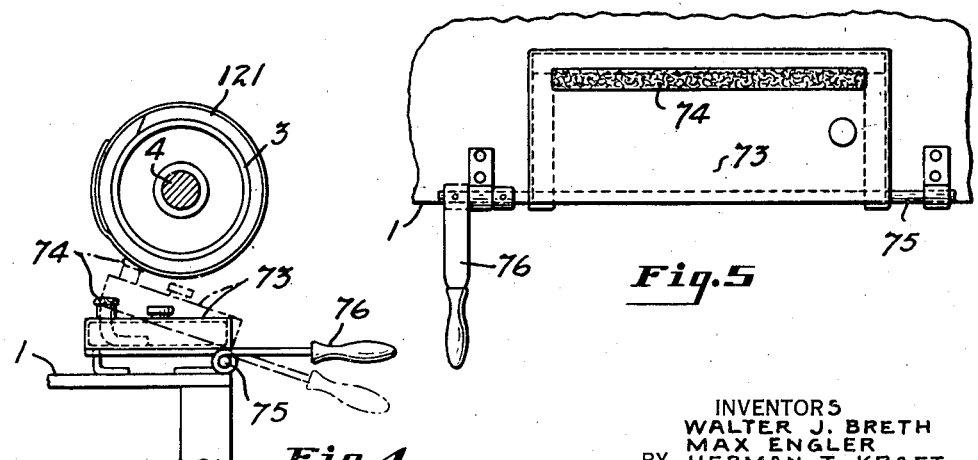
Fig. 4
Fig. 5
INVENTORS
WALTER J. BRETH
MAX ENGLER
HERMAN T. KRAFT
BY Evans & McCoy
ATTORNEYS

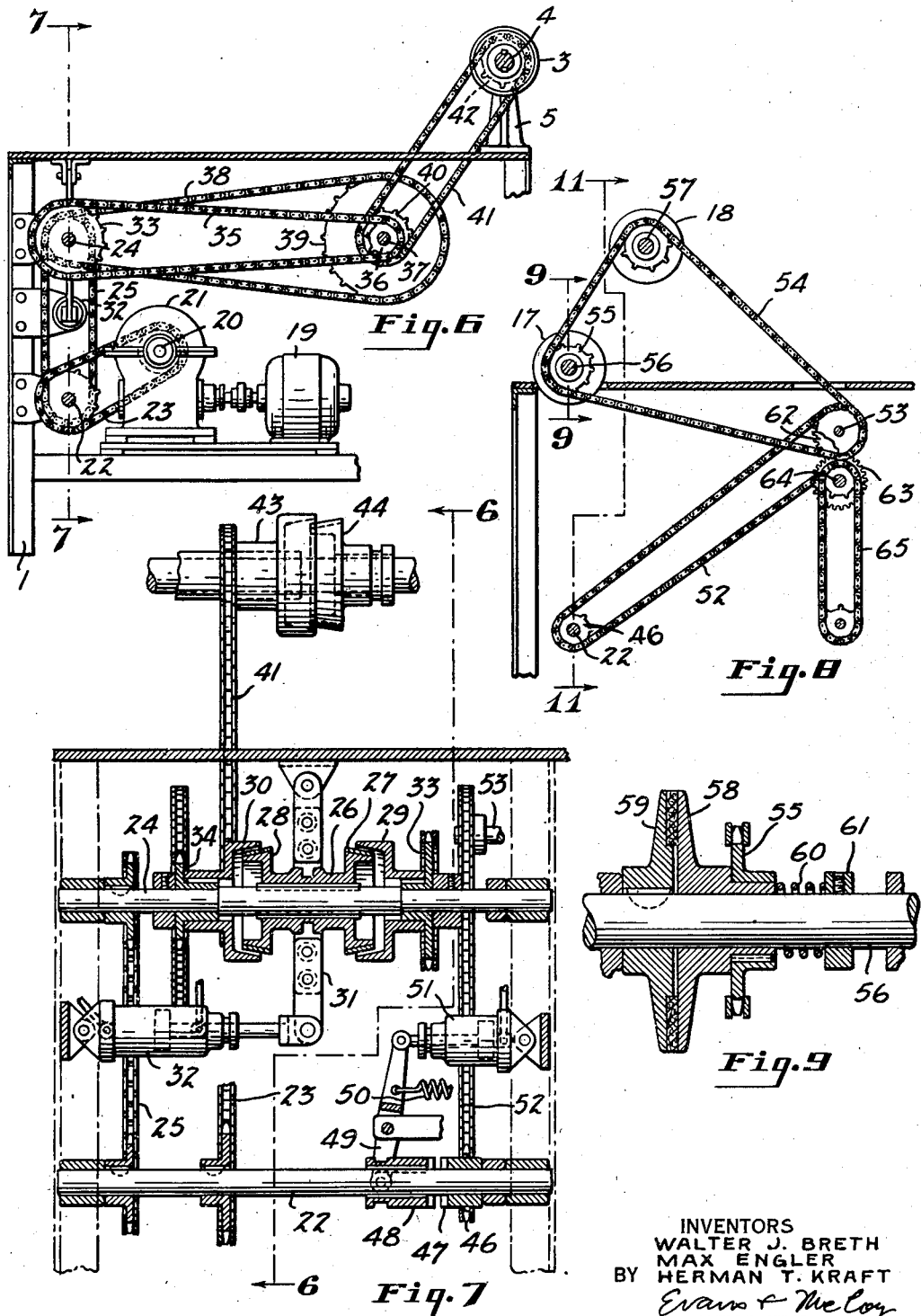

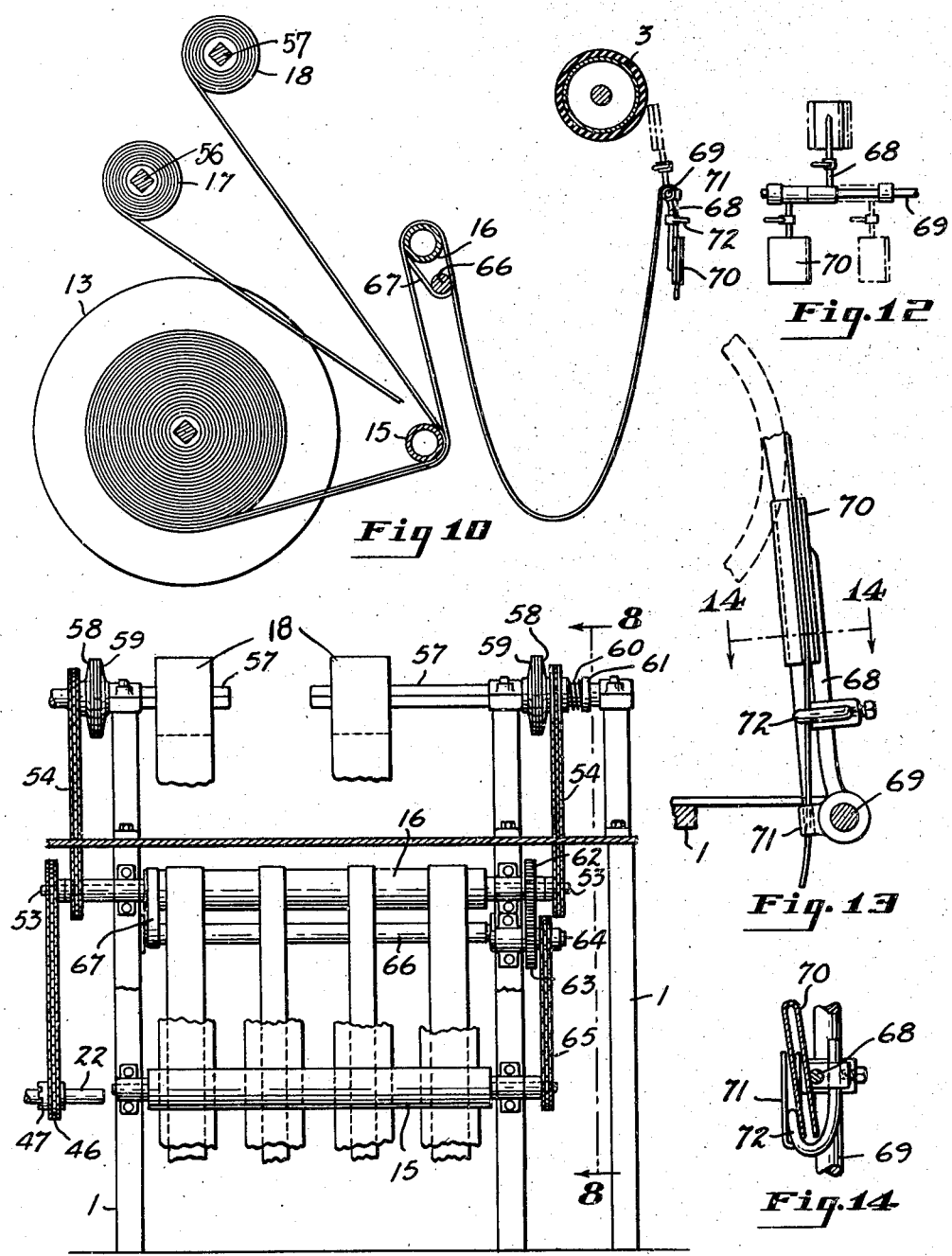

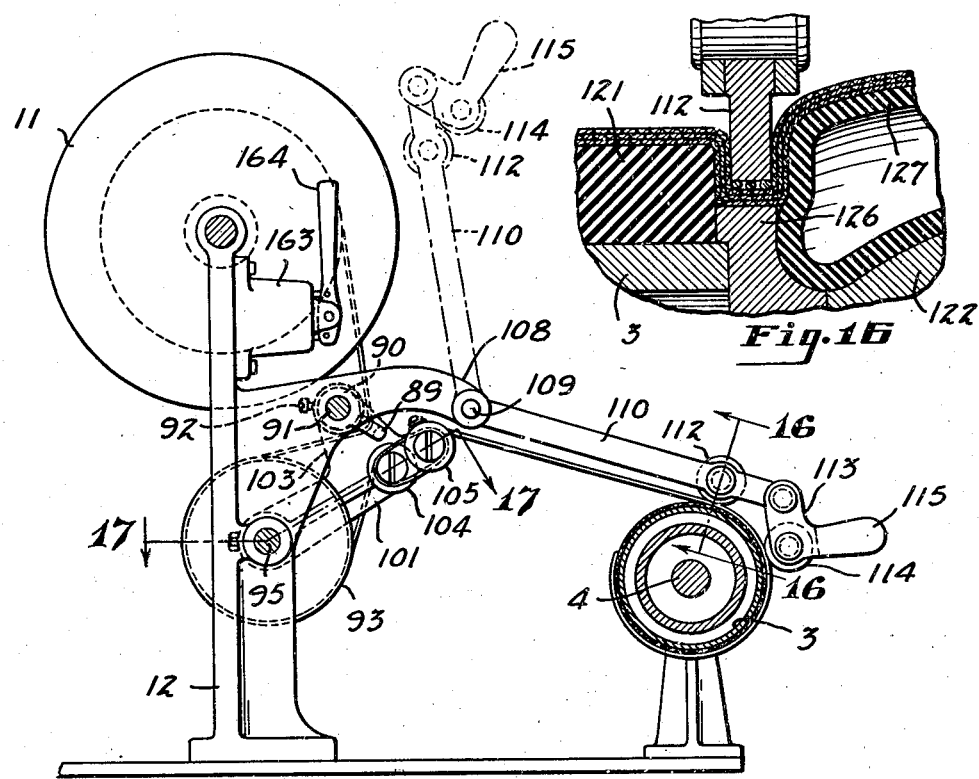
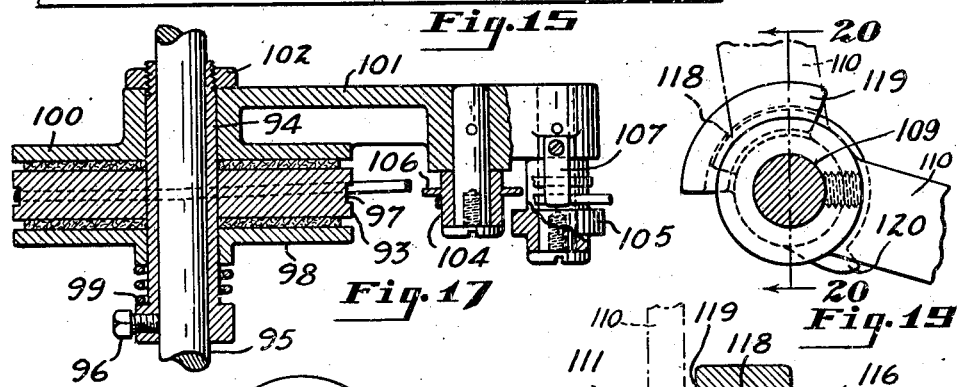
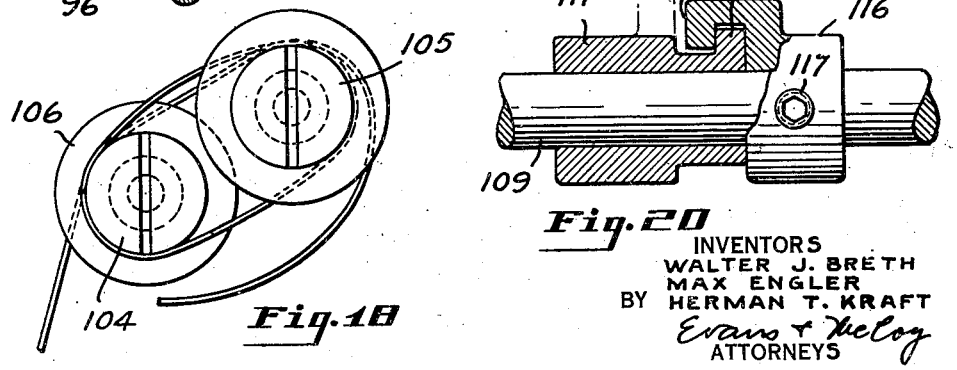

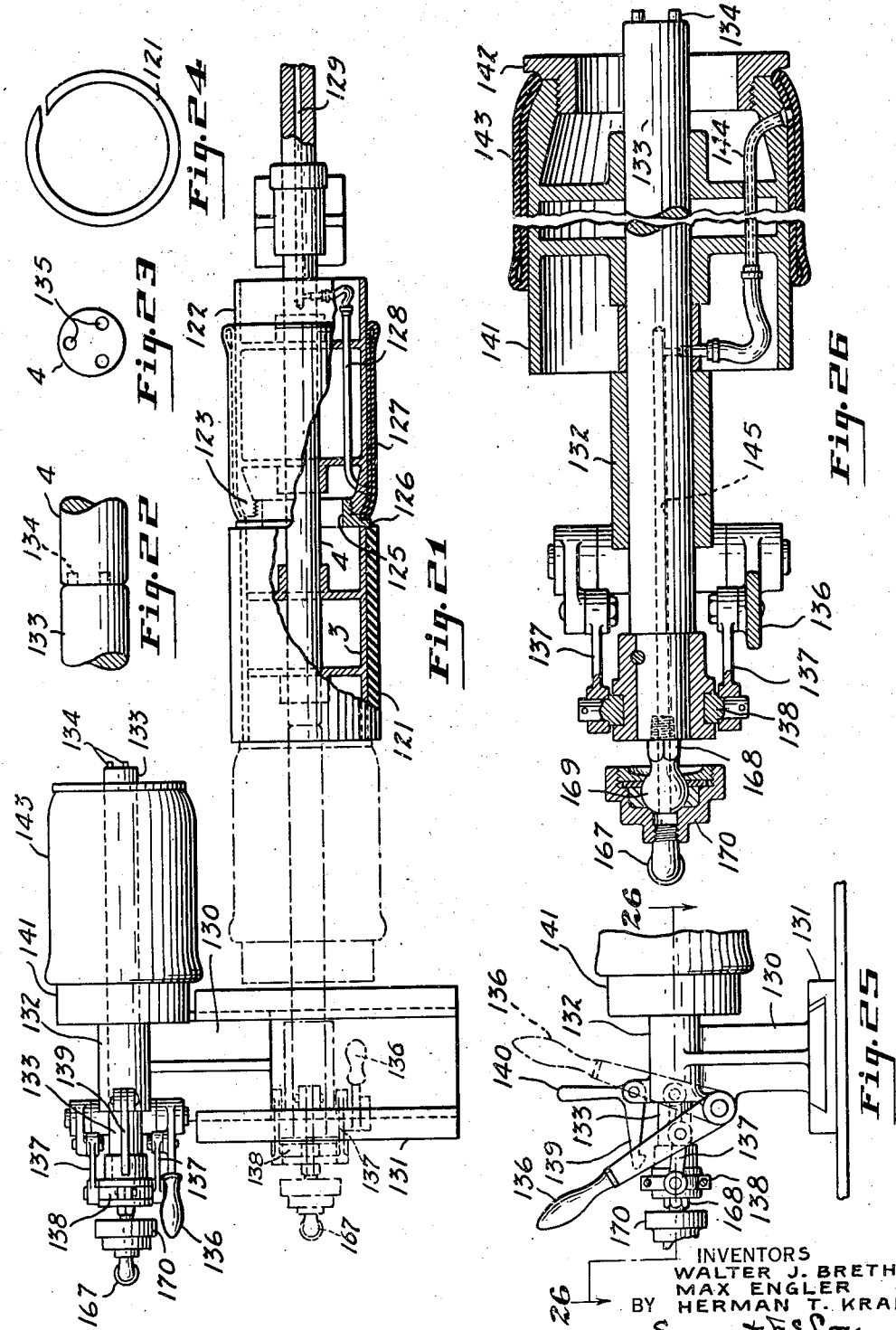

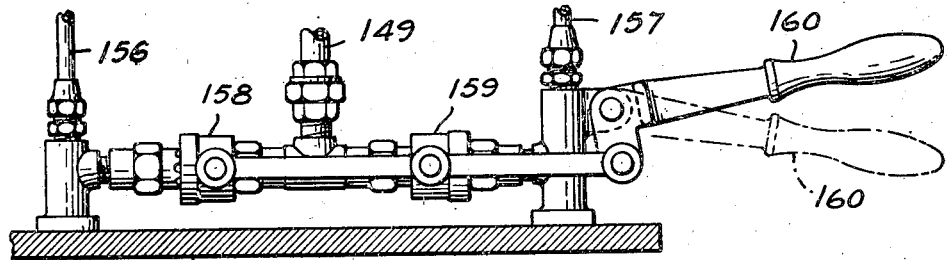
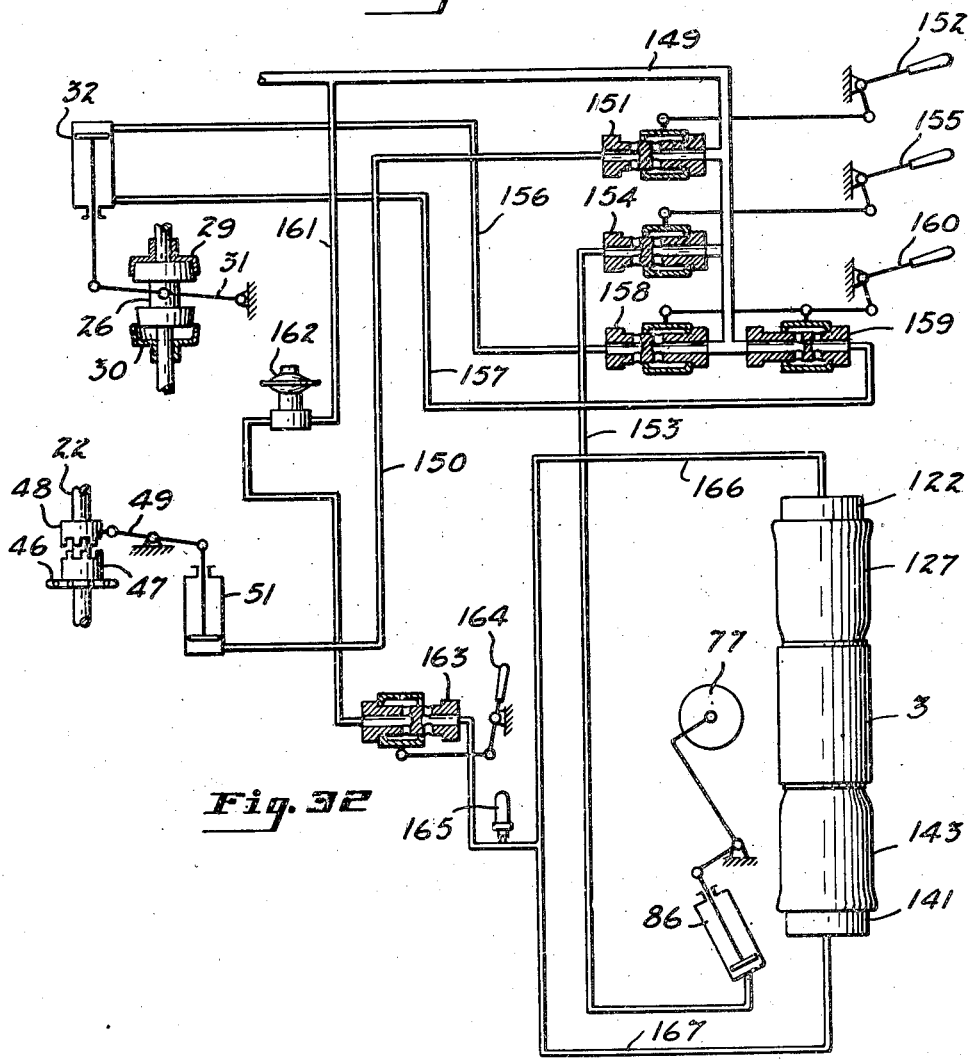

Patented Aug. 12, 1941

2,251,904

UNITED STATES PATENT OFFICE 2,251,904

TIRE BUILDING MACHINE

Walter J. Breth, Max Engler, and Herman T. Kraft, Akron, Ohio, assignors to The General Tire & Rubber Company, Akron, Ohio, a corporation of Ohio Application October 14, 1938, Serial No. 234,980

13 Claims. (Cl. 154—10)

This invention relates to tire building machines of the drum type in which the tire carcass is built upon a core of substantially cylindrical form and has for its object to provide a machine of relatively simple construction by which the building up of the fabric and rubber layers of tie tire carcass, the application of beads to the tire, and other operations are greatly facilitated.

More specifically, the invention has for an object to provide means by which the operations incident to the formation of the bead portions of the tire may be performed more rapidly and with less labor than heretofore required.

Further specific objects of the invention are to simplify the application of the bead wire to the fabric, to provide a simple and effective means for quickly folding the edge portions of the fabric over the bead rings and applying the edge portions of the body of the carcass inwardly of the beads, and to provide a construction which permits of quick removal of the tire carcass after the building operation is completed.

With the above and other objects in view, the invention may be said to comprise the machine as illustrated in the accompanying drawings, hereinafter described and particularly set forth in the appended claims, together with such variations and modifications thereof as will be apparent to one skilled in the art to which the invention appertains. Reference should be had to the accompanying drawings forming a part of this specification in which—

Fig. 3 is a front elevation of the machine with the fabric feed conveyor omitted;

Fig. 4 is a side elevation of a device for applying solvent to material on the tire building core;

Fig. 5 is a top plan view of the solvent-applying device;

Fig. 6 is a vertical section taken on the line indicated at 6—6 of Figs. 3 and 7;

Fig. 7 is a section taken on the line indicated at 7—7 in Fig. 6;

Fig. 8 is a section taken on the line indicated at 8—8 in Figs. 3 and 11;

Fig. 9 is a fragmentary section taken on the line indicated at 9—9 in Fig. 8;

Fig. 10 is a diagrammatic sectional view showing the manner in which flipper and chafer strip are fed to the tire building core;

Fig. 11 is a section taken on the line indicated at 11—11 in Fig. 8;

Fig. 12 is a fragmentary front elevation showing two of the shiftable strip-retaining guides for the flipper and chafer strips;

Fig. 13 is a fragmentary view on an enlarged scale, showing one of the strip-retaining guides in position for feeding strip fabric to the tire building core;

Fig. 14 is a section taken on the line indicated at 14—14 in Fig. 13;

Fig. 15 is an enlarged view taken on the line indicated at 15—15 in Fig. 2 showing the main tire building drum in section and the bead stock feeding mechanism in side elevation;

Fig. 16 is an enlarged section taken on the line indicated at 16—16 in Fig. 15 showing the manner in which the bead stock is applied to the stock on the core to form the bead rings;

Fig. 17 is a section taken on the line indicated at 17—17 in Fig. 15;

Fig. 18 shows the wire-bending rollers in side elevation on an enlarged scale;

Fig. 19 is a sectional view showing the pivot of the arm which carries rollers for pressing the bead stock against the fabric on the tire building core;

Fig. 20 is a section taken on the line at 20—20 in Fig. 19;

Fig. 21 is a plan view of the tire building core comprising a main drum and auxiliary drums at the ends of the main drum;

Fig. 22 shows the driving connection between the abutting ends of the main drum shaft and an aligned shaft carrying an auxiliary drum;

Fig. 23 is an end elevation of the main drum shaft;

Fig. 24 is an end elevation of the split rubber sleeve employed on the main tire building drum;

Fig. 25 is a front elevation of the movable auxiliary drum and the slide upon which it is carried;

Fig. 26 is a section taken on the line indicated at 26—26 in Fig. 25;

Fig. 32 is a diagrammatic plan view of the fluid pressure connections for supplying air under pressure to the inflatable annuli and to the various controlling cylinders;

Fig. 33 is a sectional view taken on the line indicated at 33—33 in Fig. 3 showing the double valve controlling the change speed mechanism in side elevation.

Figure 1:
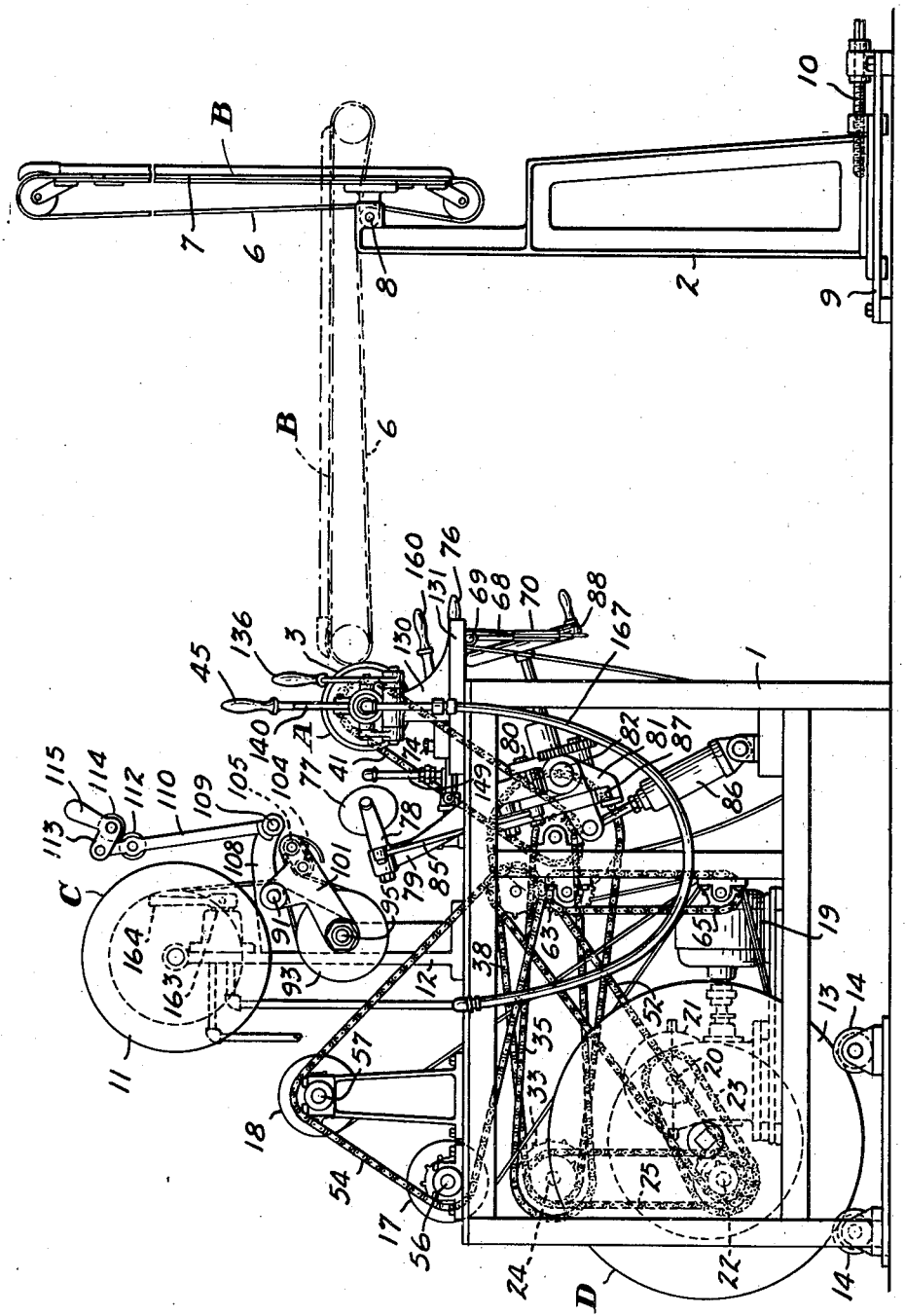
Figure 1 is a side elevation of the machine embodying the invention.
Figure 2:
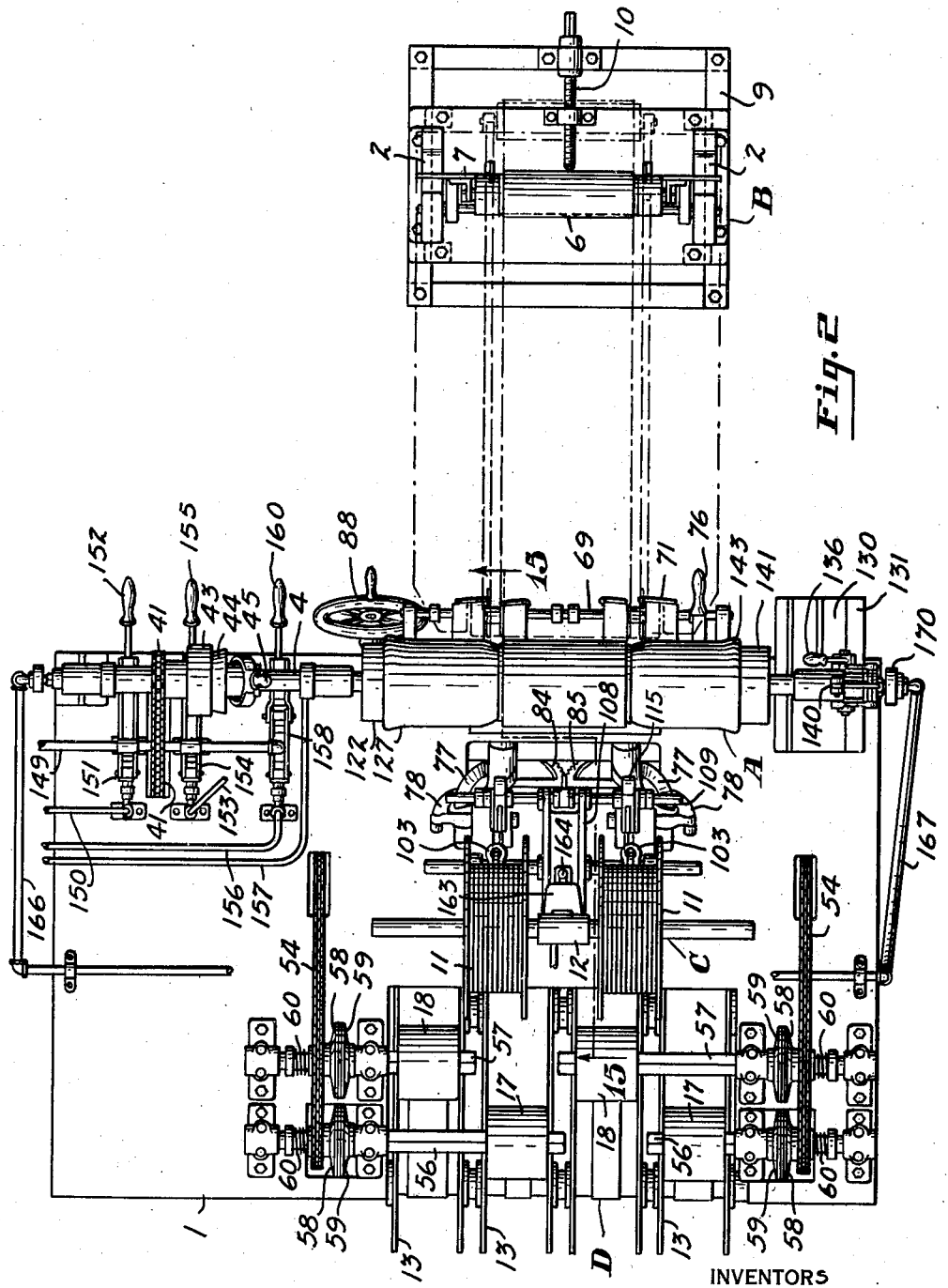
Fig. 2 is a top plan view of the machine.

The machine herein illustrated comprises a rotatable tire building core of the drum type. indicated generally in Figs. 1 and 2 by the reference letter "A"; a ply stock feed mechanism indicated generally in Figs. 1 and 2 by the reference letter "B"; a bead stock feed mechanism indicated generally in Figs. 1 and 2 by the reference letter "C"; and a feed mechanism for the flipper and chafer stock, indicated generally in Figs. 1 and 2 by the reference letter "D". The feed mechanisms B, C and D serve to supply stock as needed to the tire building core A. The tire building core A and feed mechanisms C and D are mounted on a frame 1 and the ply stock feed mechanism B is supported upon a separate frame 2 spaced from the front of the frame 1.

Upon the frame 1 there is mounted a main tire building drum 3 fixed to a transverse shaft 4, the shaft 4 being supported at its outer end by spaced bearing brackets 5 and the drum 3 being secured to the inner end of the shaft 4 inwardly of the supporting brackets.

The ply stock feed mechanism B comprises an endless feed belt 6 mounted on a frame 7 which is connected by a horizontal pivot to the upper end of the frame 2. The frame 2 is slidably mounted upon a base 9 and may be adjusted toward or away from the frame 1 by means of an adjusting screw 10. The pivotal mounting of the ply stock feed conveyor permits the same to be moved up out of the way, so that the operator can stand in front of the tire building drum in a position convenient for controlling the application of flipper and chafer strips, the forming of the bead rings, and other operations.

Two bead stock reels 11 are removably and rotatably supported upon the upper end of a standard 12 carried by the frame 1 rearwardly of the drum 3, the reels 11 being positioned to deliver strips of bead stock simultaneously to opposite ends of the main drum to form bead rings upon the previously applied fabric near the edges thereof.

Four reels 13 carrying flipper and chafer strip stock are cradled on supporting rollers 14 in the lower portion of the frame 1 adjacent the rear thereof. The flipper and chafer strips are led over driven feed rollers 15 and 16 to the bead portions of the tire being formed on the drum 3. The flipper and chafer strips are strips of rubberized fabric wound with fabric liners on the reels 13. Four liner reels mounted on the frame 1 above the reels 13 serve to wind up the liners as the stock is fed from the reels 13. Two of the reels 17 are set below and rearwardly of the other two liner reels 18 to facilitate removal and replacement of the reels.

The tire building drum, the feed rollers for flipper and chafer strips and the liner wind up reels are power driven. Power is applied through an electric motor 19 which drives a shaft 20 through a suitable reduction gearing in a housing 21. As best shown in Figs. 1 and 6, the shaft 20 drives a transverse shaft 22 journaled in the lower portion of the frame 1 through a sprocket chain 23. The shaft 22 drives a shaft 24 journaled in the frame above the shaft 22 through a sprocket chain 25. The drum shaft 4 is driven from the shaft 24, through a change speed mechanism which provides two speeds. A sliding clutch sleeve 26 is splined to the shaft 24 and carries conical clutch members 27 and 28 at its opposite ends which are engageable alternately with clutch members 29 and 30 rotatably mounted on the shaft 24. The sliding clutch sleeve 26 is shifted by means of a lever 31 which is pivoted to the frame and actuated by means of a fluid pressure cylinder 32 to shift the lever 31 in one direction to engage the clutch members 27 and 29 and in the opposite direction to engage the clutch members 28 and 30. The clutch member 29 carries a large sprocket 33 and the clutch member 30 carries a small sprocket 34. A sprocket chain 35 runs over the large sprocket 33 and a small sprocket 36 fixed to a transverse shaft 37 mounted on the frame forwardly of the shaft 24. A sprocket chain 38 runs over the small sprocket 34 and over a large sprocket 39 fixed to the shaft 37. The shaft 37 has a third sprocket 40 fixed thereto which drives a sprocket chain 41 running over a sprocket 42 fixed to the shaft 4.

When the clutch members 27 and 29 are engaged, the shaft 37 is driven at a higher speed than the shaft 24 through the sprocket chain 35. When the clutch members 28 and 30 are engaged the shaft 37 is driven at a lower speed than the shaft 24 through the chain 38. When the clutch members 27 and 29 are engaged and clutch member 28 is disengaged from the clutch member 30, the sprocket 33 is free to turn upon the shaft 24. Likewise, when the clutch members 28 and 30 are engaged the sprocket 32 is free to turn upon the shaft 24. Sprocket 42 on is driven at a higher speed than the shaft 24 through the sprocket chains 35 and 41, and at a lower speed than the shaft 24 through the sprocket chains 38 and 41. The sprocket 42 is rotatable on the shaft 4, being carried by a friction-clutch element 43. A sliding clutch element 44 is splined to the shaft 4 and is movable into and out of engagement with the clutch member 43 by means of a hand lever 45. By means of the manually operable clutch the operator may engage or disengage the drum shaft 4 from the driving mechanism at any time. By means of the cylinder 32 the operator may actuate the shiftable sleeve 27 to drive the drum shaft at the high or low speed as desired.

The feed rollers 15 and 16 and the liner wind-up reels 17 and 18 are driven from the shaft 22 through a sprocket 46, which is rotatably mounted on the shaft 22 and which has a clutch face 47 adapted to be engaged by a clutch element 48, splined to the shaft 22. The clutch element 48 is shifted into and out of clutching position by means of a lever 49, which is normally held in clutch disengaging position by means of a spring 50. The lever 49 is actuated in opposition to the spring 50 to shift the clutch member 48 to engaging position by means of a fluid pressure cylinder 51, as best shown in Fig. 7.

As best shown in Fig. 8, a sprocket chain 52 running over the sprocket 46 drives the shaft 53 of the upper feed roller 16; the shaft 53 drives two sprocket chains 54, which run over sprockets 55 on the shafts 56 and 57 of the liner reels 17 and 18. The shaft 53 of the upper feed rollers 16 has a sprocket at each end and one sprocket chain 54 is driven by each end of the shaft 53, each chain 54, driving a liner reel 17 and a liner reel 18 which take liners from a flipper strip and a chafer strip. The liner reels 17 and 18 are carried upon the inner squared ends of the shafts 56 and 57 which carry the sprockets 55.

Each liner reel is driven through a slip connection which is shown in detail in Fig. 9. This slip connection comprises a friction disk 58 rotatable on the shaft 56 or 57 and carrying a sprocket 55. The friction disk 58 has face-to-face engagement with a friction disk 59 fixed to the shaft and is pressed toward the disk 59 by means of a spring 60 interposed between the hub of the disk 58 and a collar 61 adjustably secured to the shaft. By adjusting the collar 61 the tension of the spring 60 may be varied. The frictional drive for the liner reels permits any one of the reels to slip with respect to its driving sprocket when a sufficient amount of tension on the liner strip resists rotation of the reel.

As best shown in Fig. 11, the lower feed roller 15 is driven from the shaft 53 of the upper roller 16 through a gear 62 on the shaft 53 which meshes with a gear 63 on a countershaft 64 and a sprocket chain 65 connecting the shaft 64 to the shaft of the lower roller. As best shown in Fig. 10 the stock from the reels 13 passes under the feed roller 15 and over the top of the feed roller 16. The liner strips pass rearwardly over the top of the feed roller 15 to the reels 17 and 18. To prevent contact between the tacky flipper or chafer stock on the opposite sides of the feed roller 16, and also to prevent the stock from being carried around the under side of the roller 16 by adhesion, a third feed roller 66 is provided beneath the roller 16 and this roller is driven at a speed slightly higher than the speed of the roller 16 by means of a belt 67 passing over the rollers 16 and 66 at one end thereof.

Means is provided for supporting the forward ends of the chafer and feeder strips beneath the forward portion of the tire building drum in such manner that the operator can conveniently apply the ends of the chafer and filler strips to the stock on the drum when desired. This supporting means is in the form of strip retaining arms 68 pivotally and slidably mounted on a transverse shaft 69 mounted on the frame below the tire building drum. Four arms 68 are provided and each of these arms may be adjusted laterally on the shaft 69 to feed the strips to the desired portion of the tire building drum. Each arm 68 carries a strip guide 70 adjacent its outer end which is formed of sheet metal and bent to provide a strip receiving channel of a depth substantially equal to the width of the strip. At the inner ends of the arms 70 channel guide members 71 and 72 are provided which are disposed oppositely with respect to the guide 70 so as to hold the strip against lateral movement in passing through the guides. The arms 68 normally depend vertically from the shaft 69 and retain the forward ends of the strips during the interval between the application of these strips to the stock on the core. The strip feed mechanism is preferably so operated as to maintain a festoon between the holder 68 and the feed roller 15 which will supply the desired length of flipper or chafer strip to the core.

In order to insure a strong adhesion between layers of rubber and rubberized fabric on the tire building core, means is provided for applying a solvent to the material on the core. The solvent applying means comprises a solvent receptable 73 mounted on the frame 1 immediately beneath the drum 3. This container carries a wick 74 which has a projecting edge extending parallel with the drum and of a length substantially equal to the length of the drum 3. The container 73 is carried on a transverse pivot 75 and is adapted to be swung upwardly by means of a lever 76 to bring the wick 74 into engagement with the material on the drum 3.

A stitching device of conventional design is employed to press the superposed layers of stock together upon the drum. This device comprises a pair of conical faced stitching disks 77 rotatably mounted on the outer end of arms 77 which are pivoted to the upper ends of laterally swinging arms 78 which are fixed to parallel shafts 80 journalled in a frame 81 which is carried upon a transverse rock shaft 82. Intermeshing gear segments 83 and 84 are fixed to the shafts 80 so that the swinging arms 79 are constrained to move simultaneously toward or away from each other. A link 85 connects each of the disk carrying arms 78 to the frame 81 to maintain the stitching disks 77 in proper position during their lateral movements. The frame 81 is rocked by means of a fluid pressure cylinder 86 to swing the frame 81 and stitching disks 76 vertically toward or away from the tire building core. The frame 81 carries a rack 87 which is parallel to the shaft 82 and which is guided for endwise movement in the frame. The rack meshes with gear segment 84 and is actuated through suitable gearing from a hand wheel 89 positioned at the front of the frame 1 and carried by the rocking frame 81. By actuating the frame 81 by means of the fluid pressure cylinder 86 the stitcher disk may be pressed against the material on the core. By operating the hand wheel 88 the stitcher disk can be moved back and forth across the face of the core.

The bead stock is in the form of rubber coated wires, as herein shown, it consists of a strip formed of a plurality of parallel metal wires embedded in rubber. The bead stock strips pass from the reels 11 through eyes 89 each carried by a collar 90 adjustably mounted on a transverse shaft 91 carried by the frame 12. The collar 90 is provided with a set screw 92 so that it may be adjusted longitudinally on the shaft 91. By adjusting the collar 90 the strips of bead stock may be delivered from the reels 11 at a distance apart suitable for the particular tire being built. As best shown in Fig. 15 the strips of bead stock pass rearwardly from the eyes 89 over and under a tensioning roller 93 which is rotatable on a sleeve 94 mounted on a transverse shaft 95 mounted in the frame 12. The sleeve 94 is adapted to be positioned on the shaft 95 to aline the roller 93 with the eye 103. The periphery of the roller 93 is provided with a peripheral groove 97 which serves to guide the strip. A friction brake is provided to retard the rotation of the roller 93 so as to apply a tension to the bead stock between the roller 93 and the tire building drum 3. The friction brake comprises a disk 98 slidably mounted on the sleeve 94 and engaging the outer face of the roller 93, the disk 98 being pressed inwardly against the outer face of the roller 93 by means of the spring 99, the inner face of the roller 93 engaging a disk 100 formed integrally with a frame 101 which is secured to the sleeve 94 by means of a nut 102. The frame 101 has a projection 103 which is slidable upon the shaft 91, the shafts 91 and 95 providing a support for the laterally adjustable frame 101. Adjacent the outer end thereof the frame 101 carries a pair of bending rollers 104 and 105. The inner of the rollers has a central peripheral flange 106 and the strip stock passes over the roller 104 at the inner side of the flange 106 over the outer roller 105 and back under and over the roller 104 outside the flange 106 and then over the top of the roller 105. A spring 107 attached to the frame 101 overlies the top of the roller 105 to hold the strip thereon. The wire stock passing around the bending rollers 104 is given a bend in the direction in which the wire is wound on the tire building drum so that when the wire is passed over the drum 3 it tends to assume the curvature to which it has been bent and tends to grip the surface of the stock to which it is applied. The frame 12 has a forwardly projecting arm 108 which carries a transverse shaft 109 upon which are adjustably mounted a pair of roller carrying arms 110. Each arm has a bearing portion 111 slidably and rotatably mounted on the shaft 109. Each carries adjacent its outer end a roller 112 which is adapted, when the arm is swung down toward the drum, to bear against the surface of a strip of bead stock being wound on the core. At the outer end of each arm 110 there is a pivoted extension 113 which carries a second pressure roller 114 and each of the extensions has a hand grip portion 115 by means of which the operator may press the rollers 112 and 114 against a strip of bead stock as it is being wound upon the core. The arms 110 are laterally adjustable so that they may be alined with the bead receiving grooves of the tire building core.

In starting the bead stock on the core the arms 110 are swung downward and the rollers 112 and 114 are pressed against the bead stock until the first convolution of the bead stock is applied to the drum, whereupon the arm 110 is swung up to the dotted line position shown in Fig. 15, and the bead ring is built up by winding a number of layers of the bead stock in superposed convolutions. As shown in Fig. 16 the bead stock is applied in a channel formed in the fabric plies at each end of the main drum 3 of the core. The tension applied to the bead wires and the bending of the wires on their way to the tire building drum insures a tight winding of the superposed convolutions to form an inextensible bead ring. Means is provided for supporting the arms 110 in their inoperative position. This means is shown in Figs. 19 and 20. The bearing portion 111 of the arm 110 engages a collar 116 which is adjustably secured to the shaft 109 by means of a set screw 117. The end of the bearing portion 111 engaging the collar 116 is provided with a segmental peripheral flange 118 which is engaged by an inturned segmental flange 119 carried by the collar 116. The flange 119 retains the arm 110 against lateral movement relative to the collar 116 and permits the arm to swing independently of the collar. The bearing portion 111 of the arm carries a projecting lug 120 which engages one end of the segmental flange 119 when the arm is swung back slightly past vertical position as shown in dotted lines in Fig. 19.

To provide a removable and collapsible base for tire casings built on the core, the main drum 3, as shown in Figs. 4, 21 and 24, carries a flexible split sleeve 121 preferably formed of rubber which extends the full length of the drum. After a tire casing has been built on the core the tire casing, together with the sleeve 121, are slipped axially off the end of the drum 3, and after the tire casing has been removed from the drum the rubber sleeve 121 may be collapsed and removed from the interior of the tire casing and replaced upon the drum 3.

The drum 3 is attached to the inner end of the shaft 4 inwardly of the bearing brackets 5 which support the shaft. Outwardly of the drum 3 an auxiliary drum 122 is secured to the shaft 4. The end of the auxiliary drum 122 adjacent the drum 4 is inwardly rounded and provided with internal screw threads which receive the threads of a head 125, and the head has a flange 126 the outer edge of which provides a bead seat. The face of the head 125 abuts against the outer end of the drum 3. The flange 126 has an external diameter greater than the drum 3 but less than that of the sleeve 121 providing a shoulder against which the end of the sleeve 121 abuts and a peripheral bead receiving recess at the end of the drum. The auxiliary drum 122 carries an inflatable rubber annulus 127 which is collapsed upon the periphery of the drum 122 when uninflated and which is connected through a tube 128 to a passage 129 in the shaft 4 through which air under pressure may be admitted to the interior of the annulus to inflate the same. The inner edge portion of the annulus 127 is fastened to the drum 122 by engagement of its elastic and flexible wall in the groove formed between the flange 126 and the rounded end of the drum 122 and by its connection to the tube 128, the remainder of the annulus wall being free so that the annulus may be collapsed or folded over the drum 3 as shown in Fig. 29.

Figures 28, 29:
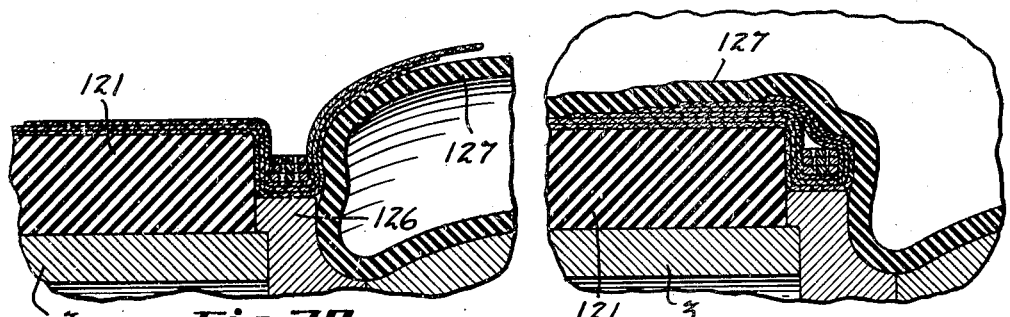
Fig. 28 is a fragmentary axial section through the core at one end of the main tire building drum showing a partially formed tire casing with a bead ring in place thereon, with the edges of the fabric overlying the inflatable annulus on one of the auxiliary drums.
Fig. 29 is a section corresponding to Fig. 28 showing the annulus forced axially over the main tire building drum, and the fabric folded over the bead ring.

When the annulus 127 is inflated a peripheral groove is provided between the adjacent end of the sleeve 121 and the annulus 127, the bottom of the groove being formed by the periphery of the flange 126, as shown in Figs. 16 and 28. In applying the fabric stock the main plies and the flipper and chafer strips are forced into this groove, providing a channel in which a bead ring may be built up.

At the end of the drum 3 opposite that at which the drum 122 is located, there is provided a slide 130 which is movable along a way 131 disposed transversely of the shaft 4. The slide 130 has a bearing portion 132 in which is journaled a shaft 133 which in one position of the slide is in axial alignment with the shaft 4. The shaft 133 is movable axially in its bearing into and out of engagement with the end of the shaft 4, and means is provided to lock the shaft 133 to the shaft 4 for rotation therewith. The inner end of the shaft 133 carries projecting pins 134 which are adapted to fit in sockets 135 formed in the end of the shaft 4, as shown in Figs. 22 and 23. The shaft 133 may be shifted into and out of engagement with the shaft 4 by means of a lever 136 connected by a link 137 to a collar 138 rotatably mounted in a groove which is suitably formed on a shaft 133. By actuating the lever 136, the shaft 133 may be moved axially toward or away from the shaft 4 to engage or disengage the shafts. A gravity latch 139 is provided on the slide 130 for engagement with the collar 138 to prevent outward movement of the shaft 133 out of locking engagement with the shaft 4, the latch 139 being provided with a handle 140 so that it can be released to permit disengagement of the shafts. The shaft 133 carries an auxiliary drum 141 of a construction identical with that of the drum 122, drum 141 having a flanged head 142 identical with head 125 of the drum 122 and engaging the opposite end of the drum 3. The drum 141 carries an inflatable annulus 143 corresponding to the annulus 127 carried by the drum 122, the annulus 143 being connected through a tube 144 with a passage 145 in the shaft 133 through which air under pressure may be admitted to the annulus 143 to inflate the same. The inflatable annuli 127 and 143 form the outer walls of bead receiving channels, as shown in Figs. 16 and 28.

Figure 27:
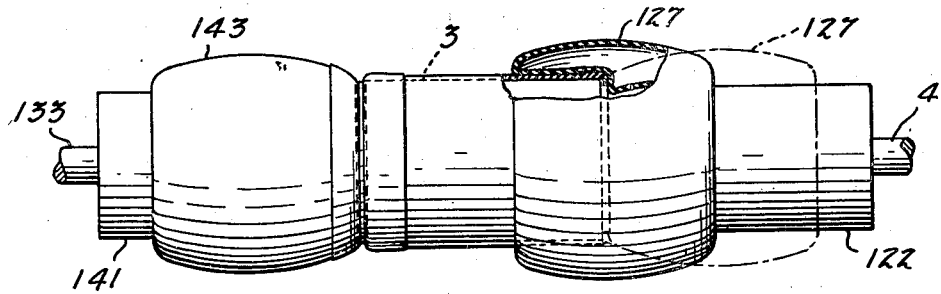
Fig. 27 is a plan view of the tire building core with the rubber annuli carried by the auxiliary drums inflated.

The main drum 3 with its sleeve 121 together with the auxiliary drums 122 and 141 with the inflatable annuli 127 and 143 form a tire building core upon which the rubber fabric and bead stock is wrapped to form a tire casing. When the fabric layers of a tire casing are applied to the core the edges of the fabric strip overlie the inflated annuli 127 and 143, as shown in Fig. 28. After a bead ring has been formed the operator may grasp the inflatable annulus and pull the outer end thereof toward the drum 3, causing the annulus to collapse over the drum, as shown in Fig. 27. The collapsing of the wall of the annulus over the end portion of the drum causes the projecting edges of the fabric strips to be folded over the bead ring and to be pressed against the exterior surface of the fabric on the drum, as shown in Fig. 29 of the drawings.

Figure 30:
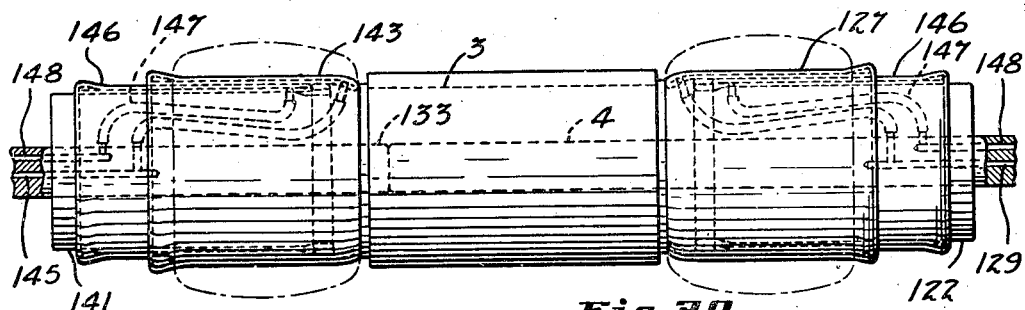
Fig. 30 is a plan view of a modified construction showing mechanical means for collapsing the inflated annuli over the ends of the main tire building drum.
Figure 31:
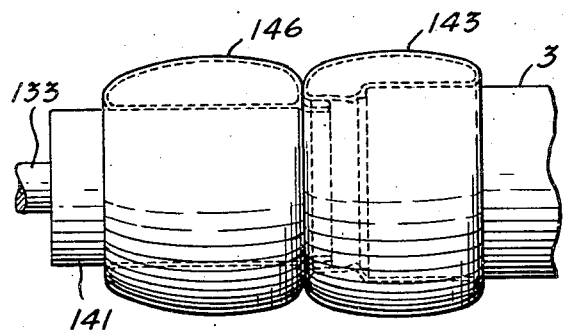
Fig. 31 is a plan view showing one of the inflated shoulder-forming annuli forced over an end of the main drum by the inflation of a second annulus mounted on the auxiliary drum.

To facilitate the folding operation, means may be provided for mechanically collapsing the inflated annuli over the ends of the drum. Such a means is shown in Figs. 30 and 31 of the drawings. The collapsing means shown consists of a second inflatable annulus 146 underlying the outer portion of each of the annuli 127 and 143, the annuli 146 being connected by tubes 147 with passages 148 in the shafts 4 and 143 through which air under pressure may be admitted to the annuli 146. After the fabric layers and the bead rings have been applied, air under pressure may be admitted to the annuli 146 causing the annuli 127 and 143 to be collapsed over the ends of the drum, as shown in Fig. 31. Folding of the edges of fabric over the bead ring has heretofore been a laborious process. The present invention provides means for substantially instantaneously folding the fabric edges evenly over the bead rings. The means for controlling the supply of air under pressure to the various controlling cylinders and to the inflatable annuli on the tire building drum is shown diagrammatically in Fig. 32 of the drawings. Air under pressure is supplied through a pressure line 149 through a branch pipe 150 controlled by a valve 151 to the cylinder 51 which operates the sliding clutch member 48 through which the strip feed mechanism is operated, the valve 151 being controlled by a lever 152 which is located on the frame adjacent the front thereof convenient to the operator as shown in Figs. 2 and 3. A branch pipe 153 controlled by a valve 154 supplies air under pressure to the cylinder 86 for operating the stitcher frame, the valve 154 being operated by a lever 155 alongside the lever 152. Pipes 156 and 157 connect the pressure line 149 with opposite ends of the pressure cylinder 32 which operates the change speed clutch, pipes 156 and 157 being provided with valves 158 and 159 which are simultaneously operated by means of a lever 160. Pressure is supplied to the inflatable annuli 127 and 143 through a pipe 161 leading from the pressure line 149. Since it is desirable to carry a low inflation pressure in the annuli 127 and 143, preferably about 10 pounds, a pressure reducing valve 162 is provided in the pipe 161. A valve 163 operated by a lever 164 controls the flow through the pipe 161. To insure a low pressure in the annuli 127 and 143 a safety valve 165 is provided between the valve 163 and the annuli which is set to open when subjected to the predetermined pressure. Air is conducted to the ends of the shafts and 133 through branch pipes 166 and 167. Since the shaft 133 is movable axially and laterally, tube 167 is flexible hose as shown in Figs. 2 and 3 and a universal coupling is provided between the end pipe 167 and the shaft 133. A coupling member 168 is attached to the outer end of the shaft 133 and has a ball end 169 which is rotatable in a swivel coupling member 170 on the end of the pipe 167.

On the completion of the building of a tire carcass on the core the latch 139 is released and the lever 136 is actuated to shift the shaft 133 outwardly clear of the drum 3, whereupon the slide 130 is moved laterally to move the auxiliary drum 141 to a position to one side of the drum 3 so as to permit the sleeve 121 and the tire casing thereon to be slipped axially from the drum 4. After the casing has been removed and the sleeve 121 replaced on the drum 3 the slide 130 is moved back to position the shaft 133 in alignment with the shaft 4 and the shaft 133 is moved toward the shaft 4 by means of the lever 136 and latched in interlocking position, whereupon another tire may be built upon the core.

In building a tire carcass, tire fabric is fed to the core by the feed conveyor 6 and a suitable number of layers are wound upon the core. The flipper and chafer fabric strips are also fed from the reels 13 and stitched to the edge portions of the carcass, the layers of fabric being pressed into the bead receiving grooves formed between the ends of the sleeve 121 and the inflatable annuli 127 and 143 to form a groove to receive the bead ring. The bead stock is then fed from the reels 11 into these grooves and wound tightly therein after which the inflatable annuli 127 and 143 are collapsed over the end of the drum 4 to fold the fabric back over the bead rings. The side wall and tread stock may then be applied to the tire by feeding the same over the conveyor 6 to the core.

As clearly shown in Figs. 2 and 3, all controlling levers are positioned at the front of the frame 1 convenient to the operator standing in front of or alongside of the tire building drum. The successive plies of material may be very quickly applied to the drum, the bead forming flipper and chafer strips being supported adjacent the core so that the operator may quickly and easily apply the ends of these strips to the material on the rotating core. The reels are all removably mounted and readily accessible from the rear of the machine so that these reels may be replaced by others very quickly.

Furthermore, it is to be understood that the particular form of product shown and described, and the particular procedure set forth, are presented for purposes of explanation and illustration various modifications of said product and procedure can be made without departing from my invention as defined in the appended claims.

What we claim is:

1. A tire building machine comprising a frame, a drum type tire building core mounted on said frame, said core comprising a main drum having a split sleeve of flexible material slidably mounted thereon, and auxiliary drums at opposite ends of the main drum and axially alined therewith, each auxiliary drum having a bead seating portion at its inner end of greater diameter than the main drum and less diameter than the sleeve, means for feeding fabric and bead ring stock to said core, and an inflatable annulus carried by each of said auxiliary drums, each annulus being spaced from an end of said sleeve to provide bead ring grooves and forming a support for edges of the fabric, each annulus being carried by an auxiliary drum and collapsible over the adjacent end of the main drum to fold the fabric over a bead ring.

2. A tire building machine comprising a frame, a drum type tire building core mounted on said frame, said core comprising a main drum having a split sleeve of flexible material slidably mounted thereon, and auxiliary drums at opposite ends of the main drum and axially alined therewith, each auxiliary drum having a bead seating portion at its inner end of greater diameter than the main drum and less diameter than the sleeve, means for feeding fabric and bead ring stock to said core, an inflatable annulus carried by each of said auxiliary drums, each annulus being spaced from an end of said sleeve to provide bead ring grooves and forming a support for edges of the fabric, each annulus being carried by an auxiliary drum and collapsible over the adjacent end of the main drum to fold the fabric on a bead ring, and means carried by each drum for collapsing its inflatable annulus over the adjacent end of the main drum to fold the fabric edges over the bead ring at that end of the drum.

3. A tire building machine comprising a frame, a drum type tire building core mounted on said frame, said core comprising a main drum having a split sleeve of flexible material slidably mounted thereon and auxiliary drums at opposite ends of the main drum and axially alined therewith, each auxiliary drum having a bead seating portion at its inner end of greater diameter than the main drum and less diameter than the sleeve, means for feeding fabric and bead ring stock to said core, an inflatable annulus carried by each of said auxiliary drums, each annulus being spaced from an end of said sleeve to provide bead ring grooves and forming a support for edges of the fabric, each annulus being carried by an auxiliary drum and collapsible over the adjacent end of the main drum to fold the fabric over a bead ring, and a support for one of the auxiliary drums movable transversely of the core axis to permit removal of said sleeve with a tire carcass thereon from the main drum.

4. In a tire building machine, a core comprising a cylindrical drum having a split sleeve of flexible material thereon, an inflatable annuli upon which the edge portions of casing fabric wound on the core are supported, each annulus being spaced from an end of said sleeve to provide a bead receiving channel in the core, each annulus being collapsible inwardly over the drum to fold the fabric edge supported thereon over a bead ring, and a support for one of said annuli mounted for movement away from the end of said drum to permit removal of said sleeve with a tire casing thereon from said drum.

5. In a tire building machine, a drum type tire building core having a cylindrical portion, bead seating portions at opposite ends of said cylindrical portion of greater diameter than the cylindrical portion, a collapsible sleeve slidably mounted on said cylindrical portion and extending from one bead seating portion to the other upon which a tire casing may be formed, the external diameter of said sleeve being greater than that of the bead seating portions, and means for supporting one of said bead seating portions for movement away from said cylindrical portion to permit removal of said sleeve with a tire casing thereon from the core.

6. In a tire building machine, a drum type tire building core having a cylindrical portion, bead seating portions at opposite ends of said cylindrical portion of greater diameter than the cylindrical portion, a collapsible sleeve slidably mounted on said cylindrical portion and extending from one bead seating portion to the other upon which a tire casing may be formed, said sleeve being formed of rubber and being split axially to enable it to be collapsed and removed from the interior of a tire casing, the external diameter of said sleeve being greater than that of the bead seating portions, and means for supporting one of said bead seating portions for movement away from said cylindrical portion to permit removal of said sleeve with a tire casing thereon from the core.

7. In a tire building machine, a drum type tire building core comprising a main drum having a split sleeve of flexible material slidably mounted thereon, auxiliary drums at opposite ends of the main drum and axially alined therewith, each auxiliary drum having a bead seat at its inner end of greater diameter than the main drum and less diameter than said sleeve and a movable support for one of said drums whereby the latter may be moved away from an end of said main drum to permit removal of said sleeve with a tire casing thereon.

8. A tire building machine comprising a frame, a horizontal shaft journalled in the frame and having a projecting end portion, a drum fixed to the projecting end portion of said shaft, means for driving said shaft, a support mounted on the frame for movement transversely of said shaft, a second shaft carried by said support and mounted for rotative and axial movements in the support, the second shaft, in one position of said support, being axially alined with the first shaft, a disengageable driving connection between said shafts, and an auxiliary drum carried by said second shaft which is axially aligned with the first mentioned drum when said shafts are in axial alignment.

9. A tire building machine comprising a frame, a drum type core mounted on said frame, said core comprising a main drum having a collapsible substantially cylindrical portion upon which a tire casing may be built, an auxiliary drum at each end of the main drum and axially alined therewith, each auxiliary drum having a bead seating portion at its inner end, and an inflatable annulus carried by each auxiliary drum, said annuli being adapted to support the edges of the fabric wound on the core, each annulus being of a size and shape to collapse to substantially cylindrical form on its drum when uninflated, whereby upon inflation each annulus has an inner portion of substantial width bearing against the surface of its drum, each annulus being fastened to an auxiliary drum adjacent its inner edge only whereby each annulus may be rolled inwardly over the main drum to fold the edges of the fabric over the bead rings.

10. A tire building machine comprising a frame, a drum type core mounted on said frame, said core comprising a main drum having a collapsible substantially cylindrical portion upon which a tire casing may built, an auxiliary drum at each end of the main drum and axially alined therewith, each auxiliary drum having a bead seating portion at its inner end, an inflatable annulus carried by each auxiliary drum, said annuli being adapted to support the edges of the fabric wound on the core, each annulus being of a size and shape to collapse to substantially cylindrical form on its drum when uninflated, whereby upon inflation each annulus has an inner portion of substantial width bearing against the surface of its drum, each annulus being fastened to an auxiliary drum adjacent its inner edge only whereby each annulus may be rolled inwardly over the main drum to fold the edges of the fabric over the bead rings, and means carried by each of the auxiliary drums for forcing the outer edge portions of the inflatable annuli inwardly toward said drum to collapse said annuli over the drum and fold the edge portions of the fabric over the bead rings.

11. A tire building machine comprising a frame, a drum type core mounted on said frame, said core comprising a main drum having a collapsible substantially cylindrical portion upon which a tire casing may be built, an auxiliary drum at each end of the main drum and axially alined therewith, each auxiliary drum having a bead seating portion at its inner end, an inflatable annulus carried by each auxiliary drum, said annuli being adapted to support the edges of the fabric wound on the core, each annulus being of a size and shape to collapse to substantially cylindrical form on its drum when uninflated, whereby upon inflation each annulus has an inner portion of substantial width bearing against the surface of its drum, each annulus being fastened to an auxiliary drum adjacent its inner edge only whereby each annulus may be rolled inwardly over the main drum to fold the edges of the fabric over the bead rings, a second inflatable annulus carried by each auxiliary drum, the second inflatable annulus of each drum underlying the first, and means for supplying fluid under pressure independently to the inflatable annuli of each auxiliary drum.

12. In a tire building machine, a tire building core having a central collapsible fabric receiving member of substantially cylindrical form, bead seats at opposite ends of said cylindrical member which are of less diameter than said cylindrical member and inflatable annuli mounted at the outer sides of said bead seats, said annuli when inflated having inner side walls projecting outwardly past said bead seats and forming the outer walls of bead receiving channels.

13. A tire building machine comprising a tire building core having a central collapsible fabric receiving member of substantially cylindrical form, bead seats at opposite ends of said cylindrical member which are of less diameter than said cylindrical member, inflatable annuli mounted at the outer sides of said bead seats, said annuli when inflated having inner side walls projecting outwardly past said bead seats and forming the outer wall of bead receiving channels, means for driving said core, means for feeding fabric to said core, and means for applying wire bead stock to the fabric on the core, including pressure applying rollers engageable in the bead receiving channels.

WALTER J. BRETH.
MAX ENGLER.
HERMAN T. KRAFT.